Patented Oct. 26, 1954

2,692,818

UNITED STATES PATENT OFFICE 2,692,818

REMOVING NITROGEN TRICHLORIDE FROM CHLORINE

Howard Albany Bewick, Syracuse, N. Y., assignor to Allied Chemical & Dye Corporation, New York, N. Y., a corporation of New York No Drawing. Application July 18, 1950,
Serial No. 174,591

3 Claims. (Cl. 23—219)

This invention relates to purification of chlorine and more particularly refers to a new and improved method for removing nitrogen trichloride from chlorine containing the same.

Violent explosions have occurred in chlorine containers resulting according to investigators from the presence of nitrogen trichloride in the liquid chlorine. The nitrogen trichloride, because of its much higher boiling point, becomes concentrated in liquid chlorine as the chlorine is vaporized from the container. When the chlorine is vaporized, the easily detonated nitrogen trichloride may explode when confined in sufficient concentration in the restricted space of a container. Relatively small quantities of nitrogen trichloride in chlorine may cause an explosion; liquid chlorine containing more than 0.5 part per million is considered unsafe.

Although it has been recognized for years that commercial chlorine often contains nitrogen trichloride in amount far exceeding the specification limit, the only practical solution to my knowledge for minimizing the explosion hazard due to the presence of nitrogen trichloride, has been the treatment of liquid chlorine with nitrosyl chloride (NOCl) which decomposes the nitrogen trichloride as disclosed in U. S. Patent 2,087,278. The overall reaction may be represented as follows:

$$NCl_3 + NOCl = N_2O + 2Cl_2$$

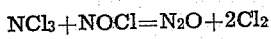

While this method has been satisfactory for minimizing nitrogen trichloride, its application is somewhat limited for the reason that excess nitrosyl chloride as well as nitrogen oxide compounds resulting from the action of the nitrosyl chloride are negative catalysts for chlorination of organic aromatic compounds such as toluene. Furthermore, the nitrosyl chloride treatment is cumbersome because it is a batch process on receivers, cars or ton containers, and also if the liquid chlorine is cold the reaction time may be unduly prolonged.

The primary object of the present invention is to provide a simple, efficient method for reducing the nitrogen trichloride concentration in liquid chlorine to a value below 0.5 part per million.

In general my process consists in passing chlorine gas containing nitrogen trichloride, as commercially produced either by the electrolytic method involving electrolysis of brine or by the action of nitric acid or nitrogen tetroxide on metal chlorides, through a solid, porous adsorbent material such as alumina, bauxite, silica gel, alumina gel, kieselguhr, fuller's earth, adsorbent clays and natural earths, and activated carbon, whereby the chlorine gas after contact with the solid, porous adsorbent material has been substantially reduced in nitrogen trichloride concentration. While I do not wish to predicate my invention on any theory or mechanism of reaction, I have found that the solid, porous adsorbent material has a preferential and selective adsorption for nitrogen trichloride. My experiments also indicated that in addition to adsorption of nitrogen trichloride certain of the solid, porous adsorbent materials effect to some extent decomposition of the nitrogen trichloride. Of the various solid adsorbents tested by me activated alumina and activated bauxite were of about equal efficiency for removing nitrogen trichloride from chlorine gas and are my preferred adsorbents. I have also discovered that the rate of nitrogen trichloride removal from chlorine gas may be accelerated and the life of the adsorbent appreciably increased by the addition-deposition, coating and impregnation of metal salts or metal oxides to the solid, porous adsorbent material. Examples of the metal salts and metal oxides which have been successfully employed in the process of my invention are $CuCl_2$, $NiCl_2$, $CoCl_2$, $FeCl_3$, $CrCl_3$, $SrCl_2$, $Na_2B_4O_7$ and the oxides of copper, iron, cobalt and nickel. Alumina and bauxite coated with cupric chloride were found to be superior, the most effective for long periods of time, to solid, porous adsorbents alone or to adsorbents coated with other metal compounds.

The apparatus and method of operation for carrying out the present invention are extremely simple and inexpensive. Commercial chlorine obtained from the manufacturing process is first dried by 90–96% $H_2SO_4$ as is conventional and then passed through a tower packed with a solid, porous adsorbent material of about ¼ inch to 8 mesh coated with a metal salt or oxide and the resultant chlorine gas substantially free from nitrogen trichloride liquefied in a manner conventional in the art. In general the catalyst activity will be found to be high for about 10 or more days after which regeneration of the catalyst may be readily accomplished by passing heated air through the adsorbent material so as to give a bed temperature of 100-300° C. for various periods of time—usually 1-6 hours will be sufficient. In order to maintain continuity of operation alternate packed towers may be employed, i. e. when one tower containing the adsorbent material becomes inactivated the flow of chlorine may be directed to a second tower and the disconnected first tower then regenerated. The rate of flow of chlorine gas through the packed tower will be dependent on various factors as for example the concentration of nitrogen chloride in the chlorine gas to be treated and the particular adsorbent employed. Ordinarily a rate of about one pound of chlorine per hour per four ounces of adsorbent material will reduce the concentration of chlorine gas containing 3-9 parts per million nitrogen trichloride to less than 0.5 part per million nitrogen trichloride. The operation may conveniently be carried out at substantially atmospheric temperature and pressure. Higher temperatures and pressures are beneficial but unnecessary.

The following examples illustrate the present invention:

Example 1

Chlorine gas containing an average of 5.6 p. p. m. $NCl_3$ at a temperature of 25-30° C. and at the rate of 3.5 lbs. chlorine per hour per pound adsorbent was introduced into the bottom of a tower packed with 8-14 mesh activated alumina and maintained at substantially atmospheric pressure, passed upward through the tower in contact with the alumina in the tower and then withdrawn from the top of the tower. The concentration of $NCl_3$ in the thus treated chlorine gas had an average of 0.5 p. p. m. $NCl_3$. Removal of the $NCl_3$ in the chlorine gas was continued for 232 hours, after which the alumina was activated by heating at 220° C. for two hours.

Example 2

Chlorine gas containing an average of 5.9 p. p. m. $NCl_3$ at a temperature of 25-30° C. and at the rate of 3 lbs. chlorine per hour per pound adsorbent was introduced into the bottom of a tower packed with 8-14 mesh activated bauxite and maintained at substantially atmospheric pressure, passed upward through the tower in contact with the bauxite in the tower and then withdrawn from the top of the tower. The concentration of $NCl_3$ in the thus treated chlorine gas had an average of 0.2 p. p. m. $NCl_3$. Removal of the $NCl_3$ in the chlorine gas was continued for 293 hours, after which the bauxite was activated by heating at 220° C. for two hours.

Example 3

Chlorine gas containing an average of 4.6 p. p. m. $NCl_3$ at a temperature of 25-30° C. and at the rate of 3 lbs. chlorine per hour per pound adsorbent was introduced into the bottom of a tower packed with 6-16 mesh silica gel and maintained at substantially atmospheric pressure, passed upward through the tower in contact with the silica gel in the tower and then withdrawn from the top of the tower. The concentration of $NCl_3$ in the thus treated chlorine gas had an average of 0.4 p. p. m. $NCl_3$. Removal of the $NCl_3$ in the chlorine gas was continued for 86 hours.

Example 4

Chlorine gas containing an average of 5.8 p. p. m. $NCl_3$ at a temperature of 25-30° C. and at a rate of 3 lbs. chlorine per hour per pound catalyst was introduced into the bottom of a tower packed with 8-14 mesh alumina coated with cupric chloride (25% $CuCl_2$) and maintained at substantially atmospheric pressure, passed upward through the tower in contact with the cupric chloride alumina in the tower and then withdrawn from the top of the tower. The concentration of $NCl_3$ in the thus treated chlorine gas had an average of 0.2 p. p. m. $NCl_3$. Removal of the $NCl_3$ in the chlorine gas was continued for 400 hours, after which the alumina was activated by heating at 200° C. for two hours.

The cupric chloride-alumina catalyst employed in Example 4 was prepared as follows: Activated alumina was soaked overnight in an aqueous cupric chloride solution—1100-1200 g. $CuCl_2.2H_2O$ per liter of water. The alumina was removed from the solution, allowed to drain and then heated so that a final temperature of 220° C. was maintained for three hours. The cooled catalyst now ready for use contained about 25% $CuCl_2$.

Although certain preferred embodiments of the invention have been disclosed for purpose of illustration, it will be evident that various changes and modifications may be made therein without departing from the scope and spirit of the invention.

I claim:

1. A process for removing nitrogen trichloride from manufactured chlorine consisting essentially of chlorine containing minor amounts of impurities including moisture and nitrogen trichloride which comprises dehydrating said impure chlorine and subsequently continuously passing the dried chlorine in gaseous form at a temperature below 100° C. through a bed of finely divided solid, porous, adsorbent material selected from the group consisting of activated alumina, bauxite, silica gel, alumina gel, kieselguhr, fuller's earth, adsorbent clays and activated carbon, coated with a metal chloride selected from the group consisting of $CuCl_2$, $NiCl_2$, $CoCl_2$, $FeCl_3$, $CrCl_3$ and $SrCl_2$, and recovering as effluent from the bed purified chlorine substantially free of moisture and nitrogen trichloride.

2. A process for removing nitrogen trichloride from manufactured chlorine consisting essentially of chlorine containing minor amounts of impurities including moisture and nitrogen trichloride which comprises dehydrating said impure chlorine and subsequently continuously passing the dried chlorine in gaseous form at a temperature below 100° C. through a bed of porous, finely divided alumina coated with cupric chloride, and recovering as effluent from the bed purified chlorine substantially free of moisture and nitrogen trichloride.

3. A process for removing nitrogen trichloride from manufactured chlorine consisting essentially of chlorine containing minor amounts of impurities including moisture and nitrogen trichloride which comprises dehydrating said impure chlorine and subsequently continuously passing the dried chlorine in gaseous form at a temperature below 100° C. through a bed of porous, finely divided silica gel coated with cupric chloride, and recovering as effluent from the bed purified chlorine substantially free of moisture and nitrogen trichloride.

References Cited in the file of this patent

UNITED STATES PATENTS

| Number | Name | Date |
|---|---|---|
| 1,475,502 | Manning | Nov. 27, 1923 |
| 1,510,132 | Baker | Sept. 30, 1924 |
| 2,020,431 | Osborne et al. | Nov. 12, 1935 |
| 2,378,675 | Agnew et al. | June 19, 1945 |
| 2,486,912 | Belchetz | Nov. 1, 1949 |

FOREIGN PATENTS

| Number | Country | Date |
|---|---|---|
| 229,334 | Great Britain | Nov. 12, 1925 |

OTHER REFERENCES

"Some Aspects of the Behavior of Charcoal With Respect to Chlorine," article by G. S. Bohart and E. G. Adams in Journ. Amer. Chem. Soc., vol. 42, March 1920, pages 523–543.

J. W. Mellor's "A Comprehensive Treatise on Inorganic and Theoretical Chemistry," vol. 2, page 94; vol. 5, page 313; vol. 8, page 604. Longmans, Green and Co., N. Y.

Manual 3–205, "The Gas Mask," Oct. 9, 1941, pages 25–29. Published by U. S. War Dept.

"Uses and Applications of Chemicals and Related Materials," by Thomas E. Gregory, 1939, 2nd ed., page 26, Reinhold Publishers Corp., N. Y.